United States Patent

[11] 3,623,806

| [72] | Inventor | Jerome M. Short |
| | | Burnsville, Minn. |
| [21] | Appl. No. | 867,634 |
| [22] | Filed | Oct. 20, 1969 |
| [45] | Patented | Nov. 30, 1971 |
| [73] | Assignee | Minnesota Mining and Manufacturing Company |
| | | St. Paul, Minn. |

[54] ORIGINAL DOCUMENT FEEDER WITH REGISTERING GATE AND MOVABLE PLATEN
4 Claims, 5 Drawing Figs.

[52] U.S. Cl. ................................................ 355/14, 355/64, 355/75
[51] Int. Cl. .............................................. G03g 15/04
[50] Field of Search ........................................... 355/14, 64, 65, 75, 76, 100

[56] References Cited
UNITED STATES PATENTS
| 2,537,529 | 1/1951 | Hessert et al. ............... | 355/64 |
| 2,654,300 | 10/1953 | Baker ........................... | 355/100 |
| 3,272,100 | 9/1966 | Teutsch ........................ | 355/14 |

*Primary Examiner*—Samuel S. Matthews
*Assistant Examiner*—E. M. Bero
*Attorney*—Kinney, Alexander, Sell, Steldt & Delahunt

ABSTRACT: An original document feeding attachment for a reproducing machine having a exposure station including a transparent supporting member in which a registering member is adapted to be positioned over the exposure station of the reproducing machine to define therewith a portion of a guide path between a document supply tray and a document receiving tray. The attachment includes a feeder for removing one document at a time from a stack of documents in the supply tray and transporting the document to a position beneath the registering member. Means are provided for registering the removed document with the exposure station and registering member including a registration gate movable relative to the registering member into and out of the document guide path to obstruct the document guide path. The document may then be carried to the receiving tray when the machine has completed the necessary exposures.

PATENTED NOV 30 1971

INVENTOR.
JEROME M. SHORT
BY Kinney, Alexander
Sell, Steldt & DeLaHunt
ATTORNEYS

ORIGINAL DOCUMENT FEEDER WITH REGISTERING GATE AND MOVABLE PLATEN

The present invention relates to a document feeder for a reproducing machine and in one aspect to an attachment for a copy machine for automatically feeding original documents to and registering the documents with an exposure station of the copying machine and after reproduction transporting the documents from the exposure station.

The prior art sheet feeders which feed one sheet at a time have generally been used with sheets having a uniform consistency. Since original documents may be of varying size and consistency, these sheet feeders have not been useful in automatically feeding original documents to an exposure station in a reproducing machine. Recently, however, it has been found that original documents of varying consistency may be singly fed from a stack by contacting the top document with pressure-sensitive adhesive tape extending over a roller, moving the roller to a position where it is desired to feed the document, and stripping the document from the tape as shown by U.S. Pa. No. 2,919,129. However, until this time, no one has provided an original document feeder for, or as an attachment for, a reproducing machine having a transparent exposure station which may be attached or removed at the option of the user.

It is an advantage of the present invention to provide an original document feeder for use with a reproducing machine for automatically feeding a plurality of original documents from a stack in a supply tray into registration with an exposure station on the reproducing machine, and then from the exposure station into a receiving tray.

It is a further advantage of the present invention to provide an original document feeder which may combine with a reproducing machine to automatically single feed an original document from a stack in a supply tray into registry with an exposure station to produce a plurality of copies of the document and then to transport the document into a receiving tray.

It is still a further advantage of the present invention to provide an original document feeding attachment that may combine with a reproducing machine to automatically reproduce a plurality of reproductions of each of a plurality of original documents.

The present invention has the advantages desired of an original document feeder for use with the document reproducing machine having an exposure station including a transparent supporting member and comprises a document supply tray and a document receiving tray between which extends a document guide path including a registering member adapted to be positioned over a transparent supporting member of the exposure station. The feeder further comprises means for removing one document at a time from a stack of documents in the supply tray and transporting it along the document guide path to a position beneath the registering member and means for registering the document with the registering member including a registration gate movable relative to the registering member into and out of the document guide path to obstruct the path to positively register a document. The document is then transported from the registering member along the guide path and into the document receiving tray by suitable drive and guide members.

The novel features and advantages of the present invention will become apparent after reading the following description which refers to the accompanying drawing wherein.

Figure 1:
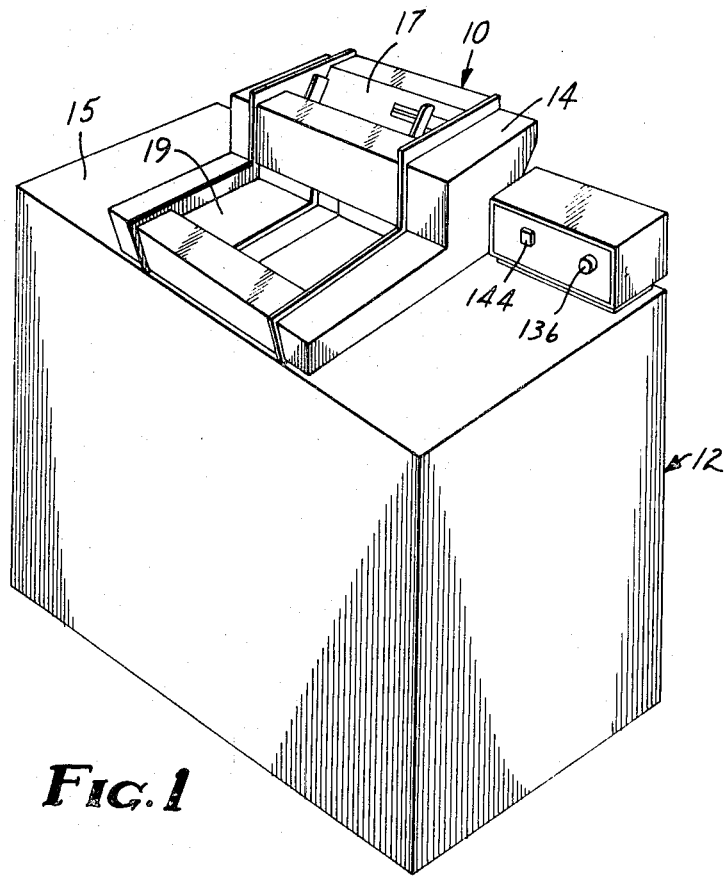
FIG. 1 is a perspective view of a document feeder made in accordance with the present invention in combination with a document reproducing machine.

A document feeder made in accordance with the present invention and generally designated 10 is illustrated in FIG. 1 attached to a document reproducing machine, generally designated 12. In combination the document feeder 10 and the document reproducing machine 12 provide for the automatic production of a plurality of reproductions of each of a plurality of original documents.

The document feeder 10 is made with a cabinet 14 to set upon the reproducing machine cabinet 15 and form an aesthetically pleasing combination therewith with an inclined document supply tray 17 and a horizontal document receiving tray 19 which are easily accessible. The document supply tray 17 is normally inclined to provide support for a stack of documents 21 with one longitudinal edge of the documents resting against the lower edge of the tray 17 to depress a leaf spring 22 to close a switch which will hereinafter be more fully described. Means for removing one document at a time from a stack of documents 21 in the supply tray 17 is provided as illustrated diagrammatically in FIG. 2 by a tape head 24. The tape head 24 may comprise a length of pressure-sensitive adhesive tape extending between a pair of spools and over a roller or small drum to provide a line of contact with a document. The head further includes a stripping element for stripping a document from the adhesive tape when the document is delivered by movement of the tape head to a dispensing position as illustrated by the sheet-feeding machine of U.S. Pat. NO. 2,919,129 to R. L. Sjostrom. The tape head 24 is supported adjacent the stack of documents 21 and it is appropriately supported by a four-bar linkage and driven from a motor 31 for rotation and translation to deliver the longitudinal edge of the uppermost document in the supply tray between a pair of nip rollers 26 and 27. The nip roller 26 is continuously driven through a pair of belts 29 and 30 from a drive motor 31 when the drive motor is energized. The roller 26 drives nip roller 27 by frictional contact to transport a document delivered to them along a guideway 33. The guideway 33 is defined by parallel pieces of sheet metal formed to deliver a document 21 to a normally horizontal position below a document registering member or platen 35 that is supported normally below the document receiving tray 19. A document drive roller 37, also driven by the drive motor 31 through belts 29 and 30, is positioned near the lowermost end of the guideway 33 and extends through the upper wall of the guideway 33 to contact the lower wall of the guideway to frictionally drive a document 21 that lies between its periphery and the lower wall of the guideway 33.

Figure 2:
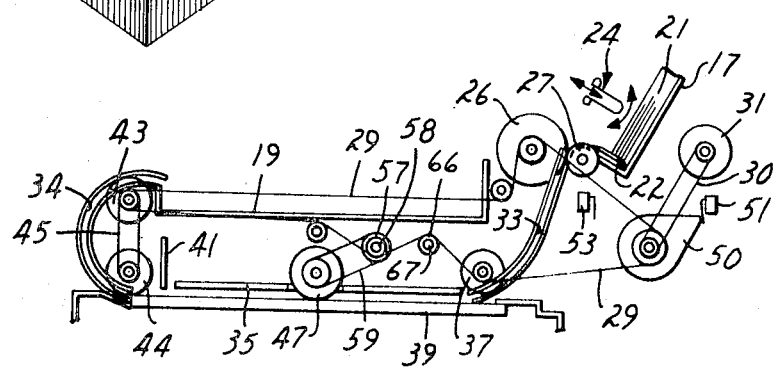
FIG. 2 is a diagrammatic view of the document feeder of FIG. 1 also showing its relation to a part of the document reproducing machine.

As diagrammatically illustrated in FIG. 2, the platen 35 is adapted to be positioned over a transparent document supporting member such as glass plate 39 defining an exposure station on the document reproducing machine 12. At the end or edge of the exposure station farthest removed along the document guide path from the supply tray 17, a registration gate 14 is movable into the document guide path against the transparent plate 39 to obstruct the document path to positively register a document and movable out of the path to permit a document to move along the guide path from the exposure station. Beyond the registration gate 41 is a generally semicircular in cross section guideway 34, defined by generally coaxial pieces of sheet metal, formed to guide a document from the platen 35, the registration gate 41 and the exposure station 39 into the document receiving tray 19. A pair of parallel document drive rollers 43 and 44 are positioned generally in vertical alignment one at each end of the guideway 34 contacting the outermost wall of the guideway 34 and driven through a series of belts 29, 30 and 45 from drive motor 31 to transport a document delivered to the lower document drive roller 44 into the document receiving tray 19. The arrangement of receiving tray 19 above the platen 35 and the semicircular guideway 34 provides means for stacking a plurality of documents placed in the supply tray 17 in the receiving tray 19 in the same face to back relationship as they are placed in the supply tray to preserve the order of a stack of documents 21.

A segmented registration roller 47 extends transverse of the width of the document guide path on the same side thereof as platen 35 generally centrally of the portion of the document guide path below the platen 35. The registration roller is rotatably supported above the platen 35 and segments of the roller 47 extend through apertures 48 in the platen to frictionally engage a document for movement of the document along the document guide path past the registering member or platen 35.

Figure 3:
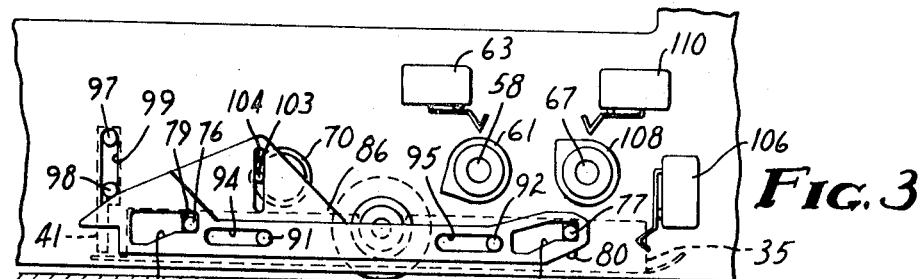
FIG. 3 is a detail elevational view of a portion of the document feeder.
Figure 4:
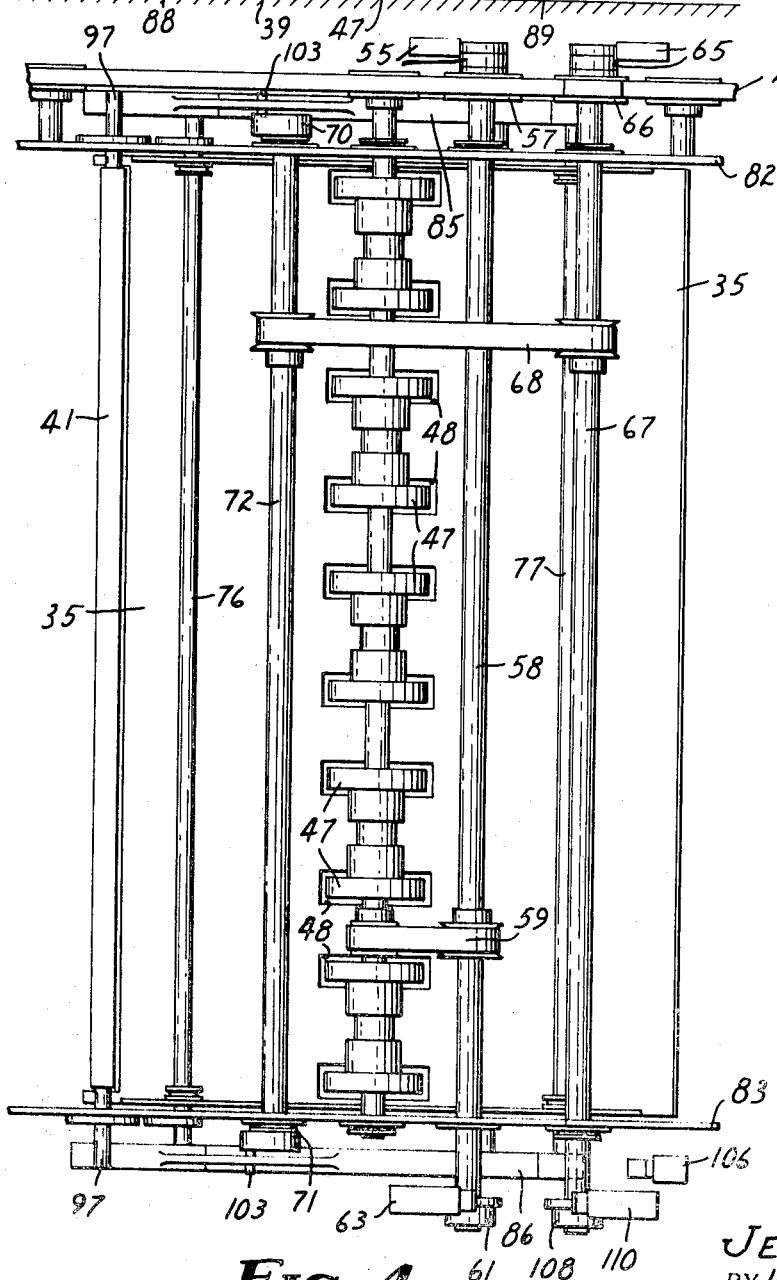
FIG. 4 is a detail top view of the part of the document feeder illustrated in FIG. 3.

As schematically illustrated in FIG. 2, the drive motor 31 drives a control cam 50. Upon energization of the drive motor 31 the control cam 50 is driven from its normal rest position illustrated in FIG. 2 in a counterclockwise direction. Upon completion of a complete revolution a lobe on the control cam closes shutoff switch 51 to deenergize the drive motor 31. During its single revolution the lobe of the control cam 50 closes a registration roller control switch 53. A single revolution clutch 55 on a shaft 58 is activated by the registration roller control switch 53 to lock a pulley 57 to the shaft 58. The pulley 57 is driven through belts 29 and 30 by the drive motor 31 and locking it to shaft 58 causes the shaft 58 and thereby the registration roller 47 through a belt 59 to rotate through 360°. The position of the registration roller control switch 53 is adjusted so that the leading edge of a document 21 is transported by the tape head 24 and drive rollers 26, 27, and 37 into contact with the registration roller 47 as the single revolution of the registration roller 47 is begun. At the opposite end of the shaft 58 from the single revolution clutch 55 is a single lobe cam 61 (see FIG. 3). The lobe of the cam 61 is positioned such that upon making approximately 200° of its revolution the lobe of the cam closes a switch 63. The switch 63 controls a 180° or half-turn clutch 65 to lock a pulley 66, that is driven through the belts 29 and 30 by the motor 31, to a shaft 67. Locking pulley 66 to shaft 67 rotates the shaft 67 180° which in turn through a belt 68 drives a shaft 72 through 180°. The shaft 72 has a registration gate and platen control slide cam 70 and 71 secured one to each end to afford vertical movement of the platen 35 and the registration gate 41.

The platen 35 has a generally planar base or lower surface for pressing a document against a transparent document supporting member or exposure station 39 of a reproducing machine 12. A pair of rods 76 and 77 extend through the sidewalls of the platen to support the platen and the ends of the rods are positioned in vertical slots 79 and 80 formed in the normally stationary sidewalls 82 and 83 of the document feeder 10. Movement of these rods 76 and 77 in the slots 79 and 80 provide for movement of the platen 35 toward and away from the transparent exposure station 39 to press a document against the exposure station. Such movement is provided by similar registration gate and platen control slide member 85 and 86 formed with inclined apertures 88 and 89 through which the platen rods 76 and 77 extend. A pair of pins 91 and 92 extend outward from each of the stationary sidewalls 82 and 83 of the document feeder through horizontal slotted apertures 94 and 95 in the slide member 85 and 86 to limit the movement of the slide members 85 and 86 to a normally horizontal direction.

The registration gate 41 extends transversely across tee document guide path and carries a pair of vertically aligned pins 97 and 98 at each of its ends which extend through a vertical slot 99 in each of the stationary sidewalls 82 and 83. The lower pin 98 at each end of the gate 41 rests on an inclined surface of the associated one of the slides 85 and 86. Each of the slide cams 70 and 71 carries a pin 103 that extends through a vertical slot 104 in each of the slide members 85 and 86 to provide horizontal translation of the slide members 85 and 86 upon rotation of the cams 70 and 71. From the position of the slide members 85 and 86 illustrated in FIG. 3, a movement of the cams 70 and 71 through 180° or half a revolution will carry the slide members 85 and 86 rearward permitting the platen 35 and the registration gate 41 to move downward under their own weight along the inclined surfaces of the slide members 85 and 86 for the rods 76 and 77 and for the pins 98 respectively. The inclined surfaces determining the descent of the registration gate and the platen are provided to immediately lower the registration gate as the slide members 85 and 86 are moved rearward to obstruct the document guide path while the descent of the platen 35 is delayed to permit the document to be driven against the registration gate 41 by the registration roller 47 before the platen 35 presses the document against the transparent exposure plate 39. A switch 106 is mounted to the rear of the slide member 86 to be closed by that slide member 86 when it is driven to its furthest rearward excursion by its associated cam 71. This switch 106 provides a signal by completing an electrical circuit to cause the first illumination of the registered document as will be more fully described hereinafter.

A single lobe cam 108 is carried on the shaft 67 which also carries the 180° clutch 65. Upon engagement of the 180° clutch 65 to raise the platen 35 and the registration gate 41 the lobe of the cam 108 closes a switch 110 which controls the single turn clutch 35 to provide a single revolution of the registration roller 47 to transport a document off the transparent exposure station 39 and, with the document drive rollers 43 and 44, to transport a document into the receiving tray 19.

The document reproducing machine 12 includes means for producing reproductions of a document registered with the transparent exposure station 39. Such means is preferably provided by an electrographic reproduction process. The preferable electrographic reproduction process, shown as a flow diagram in FIG. 5, includes the steps of illuminating the registered document to expose an intermediate sheet having a photoconductive coating, developing the latent image on the intermediate sheet by applying developer powder thereto corresponding to the images carried thereon in the presence of an electric field, transferring the developer powder to a sheet of copy paper, and fusing the developer powder to the sheet of copy paper (the last two steps being shown as a single block in FIG. 5). Such a process is described in French Pat. No. 1,456,993.

Figure 5:
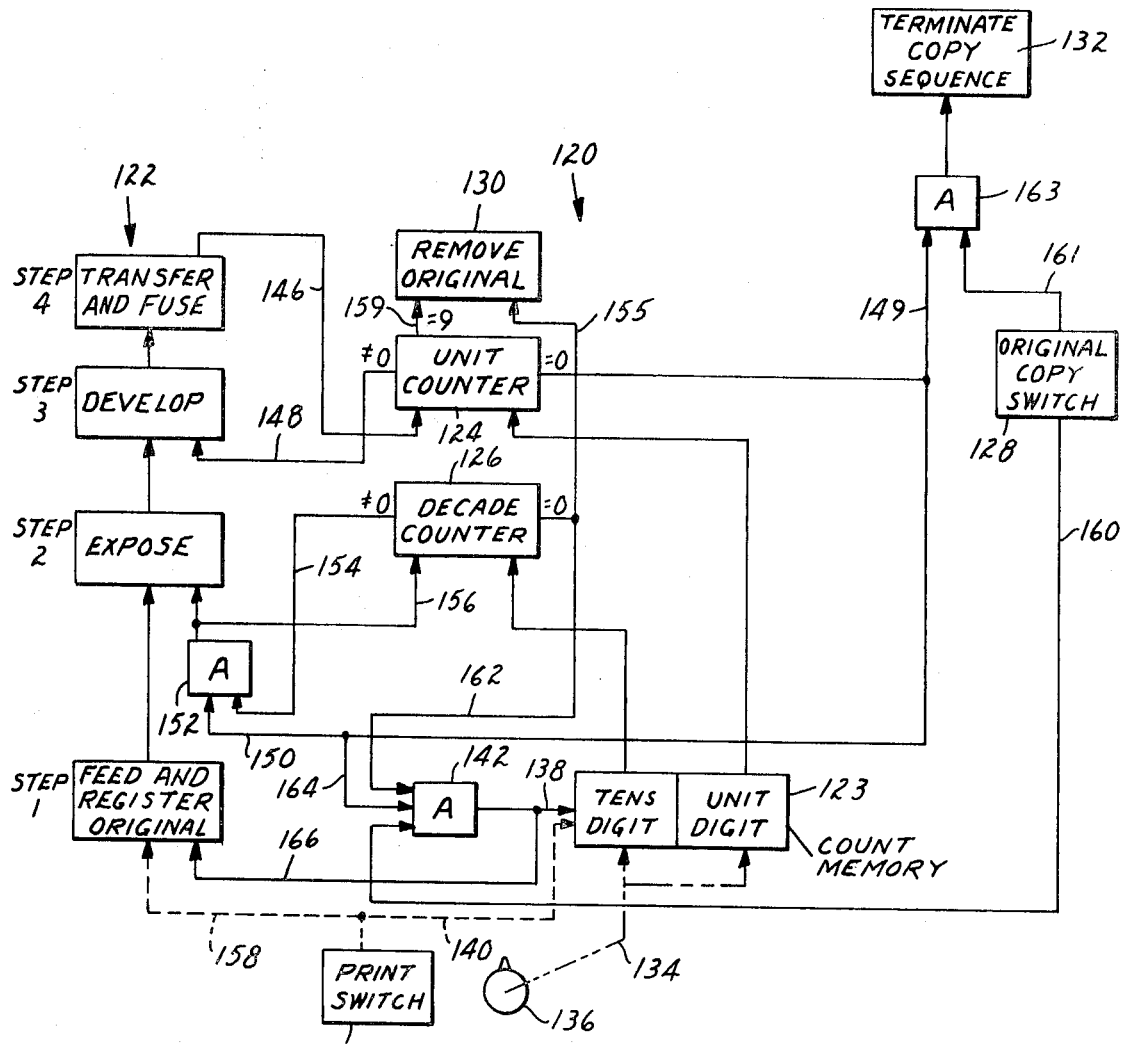
FIG. 5 is a schematic diagram showing the relationship between the functions of the document feeder and those of the document reproducing machine.

FIG. 5 also includes a functional block diagram of a copy count control section or counter means for controlling the number of copies produced, shown generally as 120. The flow diagram of the copy process is shown generally as 122. The steps of the copying process are denoted in FIG. 5 as (1) feeding and registering an original document, (2) exposing an intermediate sheet, (3) developing the latent image on the intermediate sheet by applying developer powder imagewise thereto and (4) transferring the developer powder to the copy sheet and fusing the powder to the copy sheet. Steps 3 and 4 comprise a minor loop in the copy process and may be repeated up to 10 times for each exposure of the intermediate sheet in step 2. The copy control section 120 controls the sequence in which the steps of the copying process are carried out. Copy control section 120 is shown to comprise a Count Memory 123, a Unit Counter 124, a Decade Counter 126, an Original Copy Switch 128, a Remove Original Switch 130 and a Terminate Copy Sequence Switch 132.

Count Memory 123 may simply be a two-section flip-flop register organized to store a unit-digit count in one section and a tens-digit count in the other section. As symbolically shown by the dashed line 134, the input to count memory 12 is provided from the copy counter select dial 126. The unit-digit of the count memory 123 is provided to unit counter 14 and the tens-digit of count memory 123 is provided to the decade counter 126. Gating of the count memory contents to unit counter 124 and decade counter 126 is shown to be controlled by either of control inputs 138 and 140 which, respectively, are associated with AND-gate 142 and a print switch 144. The unit counter 124 is employed to control the number of interactions of the aforementioned minor loop. Each time step 4 is completed, the unit counter is decremented via leas 146 and its contents examined for an equality with zero. If the count is not equal to zero, the minor loop is reinitiated via a signal on control lead 148. If, however, the unit count was found equal to zero, enabling signals are provided on leads 149, 150, and 164, to, respectively, AND-gate 163, AND-gate 152, and AND-gate 142. The other input to AND-gate 152 is provided by decade counter 126. If the decade counter is not equal to zero, indicating that additional copies just like the copy produced during the previous cycle are to be made, an enabling signal is provided on lead 154 from decade counter 126 to activate AND-gate 152 thereby causing another portion of the intermediate sheet to be exposed by activating step 2 of the process. The minor loop would thus be initiated for another 10 counts of unit counter 124 to provide 10 additional copies. Following initiation of the expose intermediate step, step 2, decade counter 126 is decremented via lead 156.

In use a stack of original documents 21 is placed in the document supply tray 17, the count dial 136 is set for the member of reproductions desired of each of the documents, and the pring switch 144 is pushed. To simply illustrate the operation of the document feeder 10 and the reproducing machine 12 assume that it is desired to provide 16 copies of each of two original documents 21.

The documents 21 are placed in the supply tray 17 thereby depressing the leaf spring 22 to close the original copy switch 128. The count dial 136 is then set to the 16 position causing a count of 6 to be stored in the unit-digit section and a count of 1 to be stored in the tens-digit section of the count memory 123. Print switch 144 is actuated to store the contents of the count memory 123 in the unit counter 124 and the decade counter 126 as shown by dashed line 140. The unit counter 124 is now storing the digit six and the decade counter 126 is storing the digit one.

Actuation of print switch 144 also initiates step 1 of the copy process 122 as shown by dashed line 158. This is accomplished by energization of the drive motor 31 and immediate movement of the registration gate 41 and platen 35 to their up position shown in FIG. 3. Energization of the drive motor 31 causes the tape head 24 to remove the top document from the supply tray 17 and deliver it to the nip rollers 26 and 27. The nip rollers 26 and 27 transport the removed document down the guideway 33 to the drive roller 37 which in turn propels the document onto the transparent plate 39 defining the exposure station. As the leading edge of the document nears the registration roller 47 the control cam 50 closes switch 53 to activate the single turn clutch 55. Activation of the single turn clutch 55 locks pulley 57 to its shaft 58 for one revolution to in turn cause the registration roller 47 to be rotated through 360° by the drive motor 31 through a series of belts 29, 30 and 59. Rotation of the registration roller 47 drives the document across the transparent plate 39. As the registration roller completes about 200° of its revolution the single lobe cam 61 carried by its drive shaft 58 closes switch 63. Closing switch 63 activates the 180° clutch 65 to lock the pulley 66 to the shaft 67 thereby to rotate the slide control cams 70 and 71 through 180° by the drive motor 31 through a series of belts 29, 30 and 68. Rotation of the slide control cams 70 and 71 through 180° moves the slide members 85 and 86 to their alternate position. As the slide members 85 and 86 are moved to their alternate position the registration gate is first permitted to descend against the transparent plate 39 to obstruct the path of the document driven by the registration roller 47. As the document is driven against the registration gate by the registration roller 47 the platen 35 descends to press the document against the transparent plate 39. At this time the registration roller completes its revolution and ceases its rotation. As the slide control cams 70 and 71 complete their 180° rotation they drive one of the slide members 86 against the exposure switch 106 to cause the first exposure of the registered document. The control cam 50 completes a revolution at this time and closes switch 51 to deenergize the motor 31.

Steps 1 through 4 are performed in sequence. Following step 4 the unit counter 124 is decremented via a signal on lead 146 and the contents of the unit counter are compared against zero. Unit counter 124 now stores a count of five and since the stored count is not equal to zero, a signal via lead 148 reinitiates the minor loop. Steps 3 and 4 are repeated five more times until finally examination of unit counter 124 indicates a stored count equal to zero. The decade counter 126 is not equal to zero. Consequently, enabling signals are provided on leads 150 and 154 to AND gate 152. The output from gate 152 reinitiates step 2 for the first original and decrements the Decade Counter 126 via a signal on lead 156. The minor loop of steps 3 and 4 is thereafter repeated for 10 more counts of unit counter 124. When unit counter 124 is decremented to the count of nine, an enabling signal is provided on lead 159 which in cooperation with an enabling signal on lead 155 from decade counter 126 causes the first original to be removed from the exposure station 39 in preparation for receiving the second original. This is accomplished by a signal energizing the drive motor 31 and a signal activating the 180° clutch 65. On this revolution of the control cam 50 the drive to the tape head 24 is disabled and the registration roller switch 53 is bypassed. The actuation of the 180° clutch 65, however, immediately causes the slide members 85 and 86 to be moved by cams 70 and 71 to raise the registration gate 41 and the platen 35. The single lobe cam 108 carried at the end of the slide cam drive shaft 67 which was rotated 180° counterclockwise (as viewed in FIG. 3) from the position shown in FIG. 3 as the document was registered now completes a revolution. As it completes its revolution the cam 108 closes the switch 110 which in turn activates the 360° clutch 55 to rotate the registration roller 47 through 360° to transport the document off the transparent plate 39. The 180° clutch activating switch 63 is at this time bypassed. The registration roller 47 transports the document to the drive roller 44 which with drive roller 43 transports the document along the front guide way 34 and into the document receiving tray 19. A time delay switch (not shown) activates the 180° clutch 65 after the document has been transported off the transparent plate 30 to return the platen 35 and the registration gate 41 to their normally down position. As the platen 35 and the gate 41 return to their down position the control cam 50 closes switch 51 to deenergize the drive motor 31.

AFter 10 interations of the minor loop, the counts of both the unit counter 124 and the decade counter 126 will b equal to zero. The second original will be maintaining original copy switch 128 in a closed position by depressing leaf spring 22 to provide an enabling signal on lead 160 which in combination with the signals on leads 162 and 164 from the decade and unit counters enable AND gate 142. The output of AND gate 142 is shown to be coupled by leads 166 and 138 to step 1, Feed and Register Original, of the copy process and to counter memory 123. Signals on lead 138 cause the contents of counter memory 123 to be gated to the unit counter 124 and the decade counter 126. A signal on lead 166 initiates step 1 of the copy process as described for the first document. Thereafter, the copying sequence just described for the first original is repeated for the second original. This time at the conclusion of the cycle (i.e., when the decade counter and unit counter both equal zero) original copy switch 128 is in an open position to provide an enabling signal on lead 161 which together with the signal on lead 149 from unit count 124 enables AND gate 163 to in turn activate the terminate copy sequence switch 132.

Having thus described the present invention, what is claimed is:

1. A document reproducing machine for automatically reproducing a plurality of original documents, comprising:
   a supply tray for supporting a stack of documents to be reproduced,
   a receiving tray for supporting a stack of reproduced documents,
   means defining a document guide path from said supply tray to said receiving tray including a transparent supporting member defining an exposure station on which a said original document may be supported between said document trays and a platen supported for movement toward and away from said transparent supporting member to press a document into intimate contact with said transparent supporting member, means for removing one document at a time from a said stack of documents in said supply tray, means for registering a said document with said exposure station including a registration gate at the end of said exposure station farthest removed along said guide path from said supply tray, which gate is movable into said path to obstruct said path to positively register a said document and movable out of said path to permit a said document to move along said guide path from said exposure station toward said receiving tray, means for reproducing a said document at said exposure station, means for transporting a said document removed form said supply tray along said document guide path to said registration gate and for transporting a said document after reproduction from said exposure station along said guide path into said document receiving tray, said transporting means including a registration roller extending transverse of the width of said document guide path, supported on the same side thereof as said platen and engageable with said transparent supporting member to frictionally engage and drive a said document, means for rotating said registration roller, and means for controlling said means for rotating said registration roller to cause rotation thereof through a predetermined arcuate extent after it frictionally engages a said document to transport the document to said registration gate and after reproduction of the document to cause rotation of said registration roller through a second predetermined arcuate extent to transport the document from said exposure station and past said registration gate toward said receiving tray, and means responsive to said means for controlling said means for rotating said registration roller for moving said registration gate into said guide path prior to transportation of a said document to said registration gate and for moving said registration gate out of said guide path prior to said rotation of said registration roller to transport the document from said exposure station.

2. The machine of claim 1 including means for moving said registration gate and said platen sequentially to register a said document with said exposure station as a said document is fed to the end of said exposure station adjacent said registration gate.

3. The machine of claim 1 wherein said means for reproducing a said document includes means responsive to said means for registering a said document illuminating a said document after a said document is registered with said exposure station.

4. The machine of claim 1 further including counter means for controlling the number of reproductions produced, said counter means including presetable means of predetermining the number of reproductions to be produced, and including means responsive to the transportation of the last document of a said stack of documents from said supply tray for disabling said counter means after said last document has been reproduced and transported into said document receiving tray.

* * * * *

UNITED STATES PATENT OFFICE
CERTIFICATE OF CORRECTION

Patent No. 3,623,806　　　　　　　　　　Dated November 30, 1971

Inventor(s) Jerome M. Short

It is certified that error appears in the above-identified patent and that said Letters Patent are hereby corrected as shown below:

In the Specification

Column 1, line 10, change "feed" to -- fed --.
    Column 2, line 58, change "14" to -- 41 --.
    Column 3, line 63, change "tee" to -- the --.
    Column 4, line 65, change "126" to -- 136 --,
and
              line 74, change "leas" to -- lead --.
    Column 6, line 43, change "b" to -- be --.

In the Claims

Claim 1, Column 7, line 17, change "form" to -- from --.
    Claim 3, Column 8, line 19, after "document" (first occurrence) insert -- for --.
    Claim 4, Column 8, line 23, change "of" to -- for --.

Signed and sealed this 4th day of July 1972.

(SEAL)
Attest:

EDWARD M. FLETCHER, JR.　　　　　　　ROBERT GOTTSCHALK
Attesting Officer　　　　　　　　　　Commissioner of Patents